No. 627,468. Patented June 27, 1899.
J. H. AUBLE.
MECHANISM FOR TRANSMITTING POWER.
(Application filed July 22, 1898.)
(No Model.)
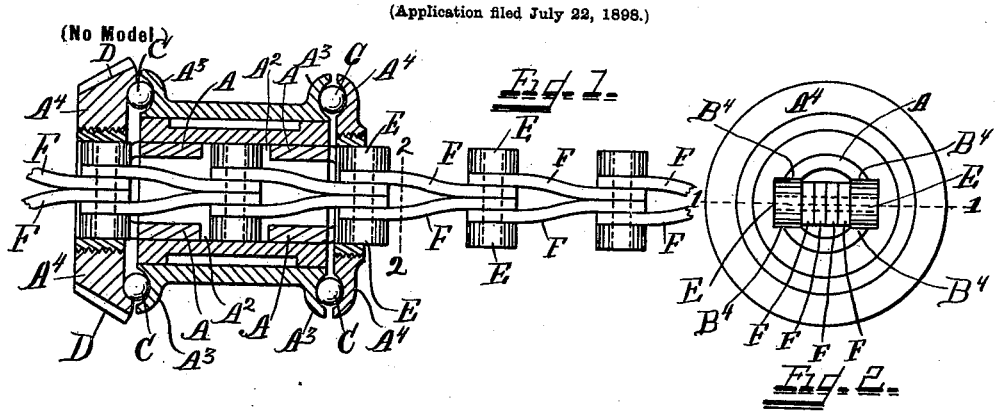
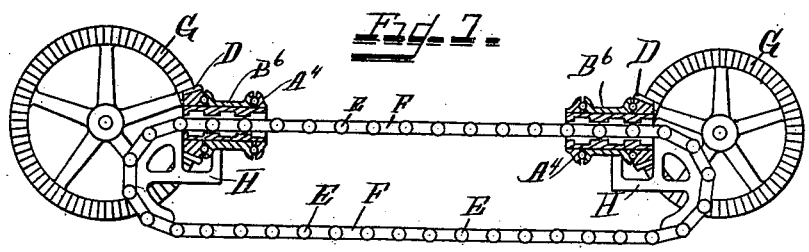
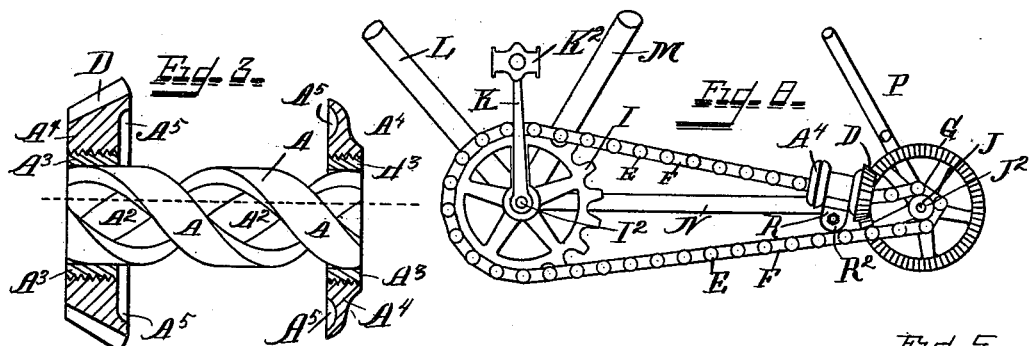
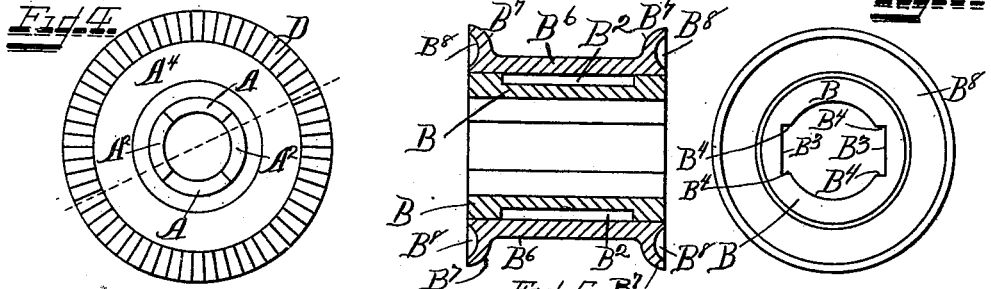
Witnesses.
Wm. J. Peek.
K. Smith.
Inventor.
James H. Auble
her Wm. Hubbell Fisher,
Atty.

UNITED STATES PATENT OFFICE.

JAMES H. AUBLE, OF DENT, OHIO, ASSIGNOR OF ONE-HALF TO JOSEPH SCHNEIDER, OF LAWRENCEBURG, INDIANA.

MECHANISM FOR TRANSMITTING POWER.

SPECIFICATION forming part of Letters Patent No. 627,468, dated June 27, 1899.

Application filed July 22, 1898. Serial No. 686,555. (No model.)

*To all whom it may concern:*

Be it known that I, JAMES H. AUBLE, a citizen of the United States, and a resident of the town of Dent, in the county of Hamilton and State of Ohio, have invented certain new and useful Improvements in Mechanism for Transmitting Power, of which the following is a specification.

The several features of my invention and the various advantages resulting from their use conjointly or otherwise will be apparent from the following description and claims.

In the accompanying drawings, making a part of this specification, and in which similar letters of reference indicate corresponding parts, Figure 1 is a view, partly in elevation and partly in section, of certain principal features of my invention. Herein the skeleton screw and its terminal rotatable bodies and the bearing which upholds these and embraces the skeleton screw to rotate therein and prevents the chain from rotation are shown in central horizontal section. The chain itself is shown in plan view and the balls of the bearings are shown in elevation. Fig. 2 is an elevation of that end of the mechanism shown in Fig. 1 which faces toward the dotted line 2 2 in said figure after all of the chain which is at the right hand of the plane of this dotted line 2 2 of Fig. 1 has been removed. Fig. 3 shows a side elevation of the skeleton screw and also shows in vertical central section the end bevel pinions or wheels and their immediate support. Fig. 4 is a view of that end of the mechanism shown in Fig. 3 which faces toward the left hand in Fig. 3, the device as shown in Fig. 4 being full, (unsectioned.) Fig. 5 represents an elevation of either end of the bearing which supports and embraces the screw and prevents the chain from rotation. Fig. 6 represents a vertical central section of the device shown in Fig. 5. Fig. 7 illustrates one mode of applying my invention in duplicate, the same parts being shown in section as in Fig. 1, but the section being vertical, the edge of the chain being shown and the large beveled gear-wheels being shown in elevation. Fig. 8 illustrates one mode in which my invention is applicable to a bicycle that it may aid in the propulsion thereof.

I will now describe my invention in detail. I employ a skeleton screw thread A or threads A. Ordinarily I prefer to employ two of such threads A A, both of the same pitch and of a requisite pitch. It follows that these threads will be spirally parallel and as arranged will be opposite, and the grooves $A^2$ described will be spirally parallel and opposite, substantially as shown. These screw-threads A are held in position by rings $A^3$, attached to the threads at the respective ends thereof, and each ring $A^3$ carries an annular bearing $A^4$, the latter preferably screwed upon and to its ring $A^3$, as shown. The purpose of the bearings is to keep the skeleton screw in place within the bearing-sleeve and enable the skeleton screw to rotate therein without friction. Each ring $A^3$ and its bearing $A^4$, affixed thereto, may be made in one piece, but are made separately, as shown, to obtain certain advantages in original construction and repair, which will be obvious after all of the functions of the parts and of their coöperation have been described.

The bearing-sleeve consists, primarily, of the inner shell B, whose internal diameter is just great enough to admit the skeleton screw A and allow it to turn readily within and without undue play. The shell is preferably lightened by having the exterior channel $B^2$ formed therein; but the latter performs no other mechanical function in the operation and may be omitted. An important feature in the construction of this sleeve-bearing is the two recesses $B^3$ $B^3$, opening into the interior space of the sleeve and located opposite one another. Each recess has shoulders or sides $B^4$ $B^4$. The width of each of the recesses $B^3$ (between its shoulders $B^4$ $B^4$) is equal to the width of either groove $A^2$ of the skeleton screw A, and the recesses $B^3$ and the grooves $A^2$ are each of a size to closely admit a lateral projection E of the chain. These lateral projections E preferably consist of a wheel and an axle, the wheel rotating on the axle. In Figs. 1 and 2 each axle of such lateral projection is indicated by dotted lines.

These lateral projections of the chain are preferably opposite one another, and the same axle extended through and at both sides of the chain serves for both wheels of the two opposite lateral projections.

A preferred mode of making the links of the chain is by providing two sublinks F F to constitute each link and by forming each sublink so that at one end of a link they embrace (go outside of) the adjacent ends of the sublinks of the link on the one hand (or end) and at the other end they lie between the adjacent ends of the sublinks of the link on the other hand (or end.) The adjacent ends of the sublinks F F F F are conveniently pivoted together by the axle which carries the adjacent wheels which assist to constitute the lateral projections E.

Before proceeding to describe further details of construction I will describe the general operation of my invention. The shell B is held stationary by suitable means. The chain moves through the shell and through the skeleton screw A. In doing this each lateral projection E of the chain enters the shell and screw. The outer portion of the projection E lies in the adjacent recess $B^3$ of the shell and rests upon the lower shoulder $B^4$ or the upper shoulder $B^4$, according as the chain is moving in one direction or the other. The inner portion of each projection E lies in an adjacent groove $A^2$ of the skeleton screw. The links of the chain E F pass through the interior of the skeleton screw. The forcible rotation of the screw A communicates a longitudinal movement to the chain, and this movement of the chain will be in the one direction or in the other, according as the screw is rotated in one direction or in the opposite one. Vice versa, if the chain be forcibly drawn a rotary motion will be communicated to the screw, and this rotation will be in one direction or the other, according as the chain is drawn in one direction or the other. Preferred means for enabling the screw to impart its rotary motion to other mechanism when rotated by the movement of the screw or to receive motion to rotate it when it is to move the chain positively are as follows: Upon the periphery of the bearing $A^4$, I locate teeth, thus converting this bearing into a toothed wheel or pinion D, and this pinion may be beveled, as shown. A suitable gear will engage this pinion.

In constructing non-frictional bearings I prefer to make them as follows: On the shell B, I fix a sleeve $B^6$, stationary with the shell, and this sleeve $B^6$, I provide with end bearings $B^7$. As I prefer to employ balls C in the bearings, I provide grooves $B^8$ in the bearings $B^7$, so as to receive a portion of the balls C, and in the adjacent faces of each of the bearings $A^4$, I form suitable recesses $A^5$ $A^5$. These recesses are not necessarily grooves. Thus the recess $A^5$ of the bearing carrying pinion D is not a groove, while the recess $A^5$ of the other bearing is an annular groove. (See Figs. 1, 3, and 6.) The interposed balls C, located between the bearings of the shell and those of the skeleton screw, enable the screw to rotate easily around the shell and without much friction, which latter would otherwise be present from that longitudinal thrust of the screw which is necessarily present in connection with the combination of the screw and sleeve.

Various modes of applying my invention are possible. Among these I illustrate two modes, respectively illustrated in Figs. 7 and 8. The mode shown in Fig. 7 consists in employing my invention in duplicate, one shell and skeleton screw being shown in connection with a gear-wheel at one end of the endless chain and another shell and screw at the other end of the chain. The chain is here guided out of one shell and screw and into the other shell and screw by means of guides H, placed, respectively, as shown.

In Fig. 8 I have shown conveniently one mode of the application of my invention to a bicycle. Here G indicates a gear-wheel of the desired diameter fixed to the shaft $J^2$ and operated by the pinion D of the screw. The shaft $J^2$ is the shaft of the driving-wheel of the bicycle. The chain E F passes through the screw and around the sprocket-wheel I, the latter fixed on a forward shaft $I^2$ and operated by the cranks K and treadles $K^2$, one of each of which is duly shown. The chain engages this sprocket-wheel. As the latter is turned it moves the chain and draws it through the screw, and thus forcibly rotates the latter and its pinion D, and the latter in turn rotates the gear-wheel G, and by intermediate connections rotates the bicycle driving-wheel.

A preferred means for keeping up the chain, so that it shall not drag and shall be properly delivered into the screw and shell, consists of the loose wheel or shive J, rotatable on shaft $J^2$.

It will be understood that the shafts or rods L, M, N, and P are parts of the frame of the bicycle.

By changing the relative sizes of gear and pinions in the constructions shown, as well as others to which my invention is capable of application, various degrees of power and speed can be obtained within certain limits, as desired.

One mode of holding the shell B stationary is to provide it with a clamp R, whose opposite sections may be caused to embrace a rod or shaft of the bicycle or other structure to which the invention may be applied. The clamp may be approximated by means of a set-screw $R^2$. (See Fig. 8.)

My invention is simple and economical of construction, readily operated, very capable, very effective in use, and applicable to many various kinds of machines to be operated. It is very compact and exceedingly light of weight. The latter qualification becomes a great advantage in its connection with bicycles or other vehicles.

What I claim as new and of my invention, and desire to secure by Letters Patent, is—

1. The combination of the rotatable skeleton screw, surrounding shell, bearing B⁴ thereof, and chain having lateral projections and adapted to enter the screw and shell, the projections of the chain entering the grooves of the shell and resting on the shoulders of the recess of the shell, substantially as and for the purposes specified.

2. The combination of the rotatable skeleton screw, the surrounding shell, means for preventing the screw from leaving the shell, and chain having lateral projections and adapted to enter the screw and the shell, the shell having recesses B³, forming shoulders B⁴, the lateral projections of the chain entering said recesses and bearing against the said shoulders, substantially as and for the purposes specified.

3. The combination of the shell having recesses at the side, the screw having the end bearing-pieces, at and against the ends of the shell, and a flexible chain having lateral projections, adapted to be received in the screw and in the recesses of the shell, substantially as and for the purposes specified.

4. The combination of the shell having recesses at the inside, the end bearing-pieces A³, the auxiliary bearing-pieces A⁴, around the former bearing-pieces, the shell having the internal recesses B³, the outer cylinder carrying the bearing-pieces B⁷, for coaction with the bearing-pieces A⁴ of the skeleton screw, and the chain having lateral projections received into the grooves of the screw and into the inner recesses of the shell, substantially as and for the purposes specified.

5. The combination of the shell having recesses at the inside, the end bearing-pieces A³, the auxiliary bearing-pieces A⁴, around the former bearing-pieces, the shell having the internal recesses B³, the outer cylinder, carrying the bearing-pieces B⁷, having grooves for the friction-balls, the delivery-pieces having guards for the balls, and the friction-balls C, and the chain having lateral projections received into the recesses of the shell, and into the grooves between the threads of the screw, substantially as and for the purposes specified.

6. In mechanism for transmitting power, a chain consisting of the links, each composed of pairs of sublinks F, F, at one end in contact, and at the other end embracing the adjacent ends of the next pair of links, the lateral extensions at the pivoted junctions of the pairs of links, a rotatable screw, and an embracing-shell, holding the screw, and means for keeping the chain from twisting while it moves through the screw and shell, substantially as and for the purposes specified.

7. In mechanism for transmitting power, a chain consisting of the links, each composed of pairs of sublinks F, F at one end in contact, and at the other end embracing the adjacent ends of the next pair of links, the lateral extensions at the pivoted junctions of the pairs of links, the pivot of the links constituting the axle, rollers going to make up the extensions journaled on this axle, a rotatable screw and a shell embracing the screw, and means for keeping the chain in a given position, and preventing torsion of it as it passes through the screw, substantially as and for the purposes specified.

JAMES H. AUBLE.

Attest:
CHAS. M. LESLIE,
K. SMITH.